(12) United States Patent
Kovacs

(10) Patent No.: US 7,644,651 B2
(45) Date of Patent: Jan. 12, 2010

(54) METHOD AND CONTROL ARRANGEMENT FOR TERMINATING ACCIDENTAL SWITCH ON OF A DEEP FRYER APPARATUS NOT FILLED WITH OIL

(76) Inventor: Laszlo Kovacs, Normafa u., 49-51, H-1121, Budapest (HU)

(*) Notice: Subject to any disclaimer, the term of this patent is extended or adjusted under 35 U.S.C. 154(b) by 501 days.

(21) Appl. No.: 10/583,745

(22) PCT Filed: Dec. 17, 2004

(86) PCT No.: PCT/HU2004/000122

§ 371 (c)(1),
(2), (4) Date: Jul. 20, 2006

(87) PCT Pub. No.: WO2005/060803

PCT Pub. Date: Jul. 7, 2005

(65) Prior Publication Data

US 2008/0319588 A1 Dec. 25, 2008

(30) Foreign Application Priority Data

Dec. 22, 2003 (HU) .................................. 0304104

(51) Int. Cl.
A47J 31/047 (2006.01)
F24H 7/00 (2006.01)
(52) U.S. Cl. .......................................... 99/281; 392/340
(58) Field of Classification Search .................. 99/281, 99/275–283, 326–331; 392/441–502
See application file for complete search history.

(56) References Cited

U.S. PATENT DOCUMENTS

| | | | | |
|---|---|---|---|---|
| 3,725,643 A | * | 4/1973 | Clausse | 219/441 |
| 3,809,858 A | * | 5/1974 | Boggs | 392/451 |
| 5,324,917 A | * | 6/1994 | Boyer et al. | 219/497 |
| 5,437,002 A | | 7/1995 | Bennett et al. | |
| 5,582,755 A | | 12/1996 | Maher et al. | |
| 5,850,503 A | * | 12/1998 | Onken | 392/441 |
| 2003/0126994 A1 | * | 7/2003 | Ponting et al. | 99/330 |

FOREIGN PATENT DOCUMENTS

| | | |
|---|---|---|
| DE | 19628274 | 1/1998 |
| HU | 9700221 | 11/1997 |
| NL | 1000643 | 12/1996 |

* cited by examiner

*Primary Examiner*—Daniel L Robinson
(74) *Attorney, Agent, or Firm*—Jordan and Hamburg LLP

(57) ABSTRACT

Method and control arrangement for terminating an accidental switch on of a deep fryer apparatus when it is not filled with oil, the apparatus comprises a vessel having closed bottom and sides, and a horizontally formed electric heating element for direct contact with the oil within the vessel. At one or more points of the inner space of the vessel the temperature is measured, by which the accidental switch on state of the apparatus is detected and terminated at the same time in such a way that a derivative of the temperature measured at the one or more determined points is defined. The heating power is automatically cut off to terminate switched on state when the value of the derivative exceeds a predetermined threshold value.

6 Claims, 3 Drawing Sheets

METHOD AND CONTROL ARRANGEMENT FOR TERMINATING ACCIDENTAL SWITCH ON OF A DEEP FRYER APPARATUS NOT FILLED WITH OIL

BACKGROUND OF THE INVENTION

The present invention relates to a method and control arrangement for terminating an accidental switch on of a deep fryer apparatus when it is not filled with oil, the deep fryer apparatus comprises a vessel closed at the bottom and at the sides, and a substantially horizontally formed electric heating element being in direct contact with the oil is placed within the vessel. Deep fat fryer apparatuses in which the temperature of the oil can be raised to a required level by means of an electrically operated heating element are often used in food industry. In the method according to the invention the temperature is measured at one or more determined points of the inner space of the vessel of the deep fryer apparatus, and by observing the measured temperature value accidental switch on of the apparatus with a vessel without oil is detected and terminated at the same time.

In the field of gastronomy there are known methods in which the temperature is continuously observed, and based on the measured values certain interventions in the operation are done. Patent application HU 9700221 discloses a control unit for electronic control of gas-cookers and/or electric boiling plates and/or roasters, grillers and the like. The control unit has an EEPROM in which time and/or temperature dependent characteristic curves and/or cycle times are stored and also, it is adapted to store additional control settings modified relative to the ones stored in the EEPROM. Patent application DE 19628274 discloses a safety device in which accidental switch on of household cooking appliances or fryers is prevented by means of a decoder and an automatic voltage cut-off unit. The safety device is also applicable to switch off the cooking appliance or fryer when it is left switched on by chance. In both cases, detection of temperature takes place directly, therefore a prompt signal for performing an automatic counter-measure can not be provided for example when accidental switch on happens in a state entirely different from the proper use, for instance when there is no oil filled in the deep fryer.

With known apparatuses when they are switched on by accident without having oil filled in them, the temperature of the heating element and the neighbouring parts within the apparatus increases rapidly which usually leads to irreversible damage of the apparatus before accidental switch on is detected. To avoid this a temperature sensor is placed at one or more points within the apparatus. The signals of the sensor (s) are continuously observed and the filament current is cut off when the temperature exceeds a predetermined value. However, experience shows that only a threshold of such a value can be determined with which the damage of the apparatus is unavoidable.

The object of the present invention is to provide an apparatus and method with which the filament current can be cut off at an earlier point of time, that is, before the apparatus without oil filled in it would inevitably be damaged when it is switched on accidentally.

SUMMARY OF THE INVENTION

In the method according to the invention the derivative of the temperature measured at one or more given point (s) is defined, and the heating power is automatically cut off in order to terminate a switched on state of a deep fryer apparatus when the value of the derivative exceeds a predetermined threshold value. The control arrangement according to the invention is adapted to determine the derivative of the temperature measured at one or more given point(s), and to cut off the heating power in order to automatically terminate a switched on state of a deep fryer apparatus when the value of the derivative exceeds a predetermined threshold value.

BRIEF DESCRIPTION OF THE DRAWINGS

A detailed description of the invention will now be given with reference to the accompanying drawings in which.

DETAILED DESCRIPTION OF THE INVENTION

Figure 1:
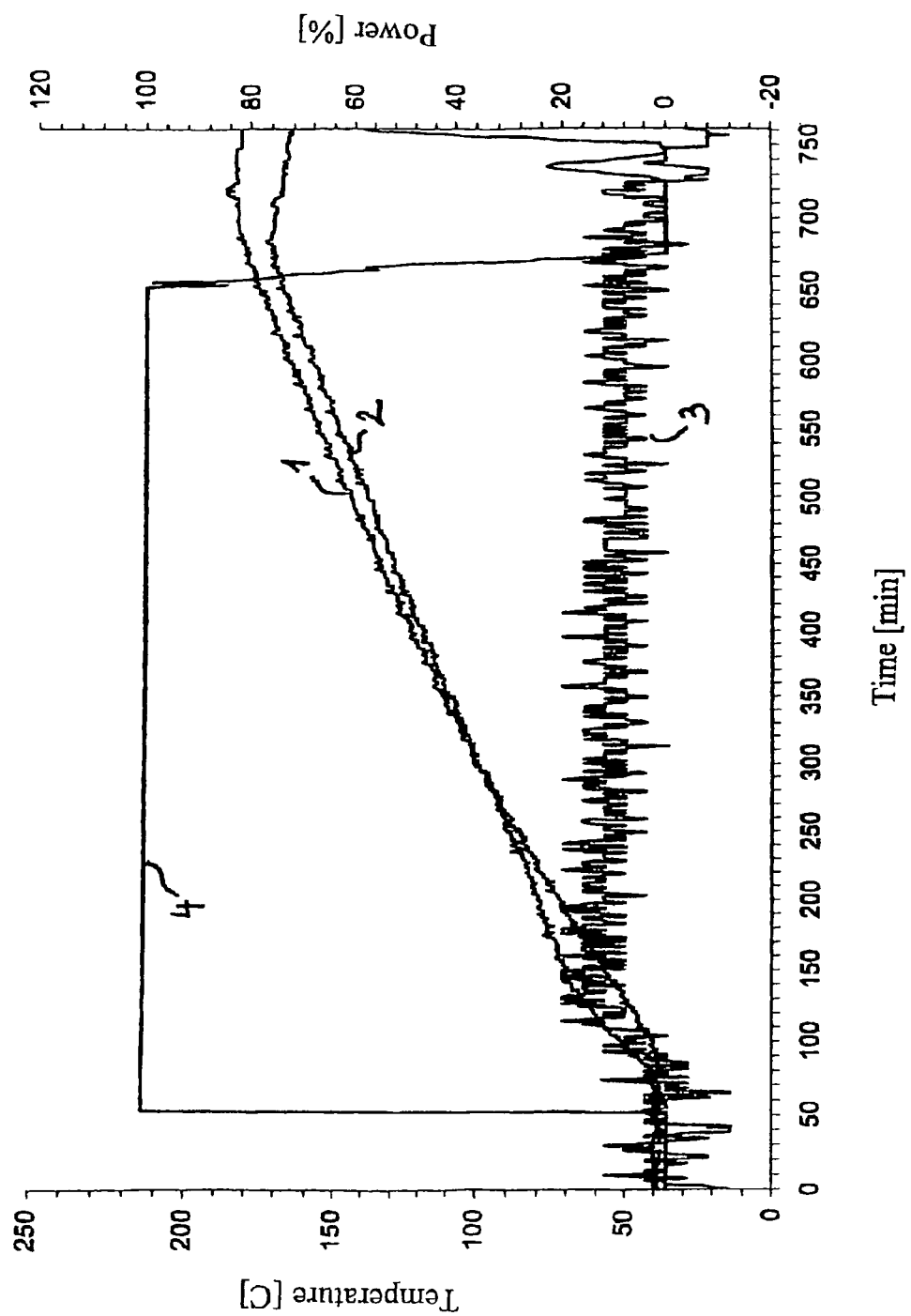
FIG. 1 is a diagram showing the temperature change plotted against time when the deep fryer apparatus is filled with oil.

In FIG. 1 a diagram showing the temperature change plotted against time can be seen in the case when the deep fryer apparatus is filled with oil. In the same dia-gram the change occurring in the power of the deep fryer apparatus (at the time of switching on and switching off) is also represented, resulting in a stepped function curve having two explicit values. It is perceptible that temperature 1 at the bottom part in-creases at a constant velocity, while temperature 2 in the vicinity of the surface changes almost likewise. When temperature 1 at the bottom part or temperature 2 in the vicinity of the surface reaches a predetermined threshold value heating power is cut off automatically.

Figure 2:
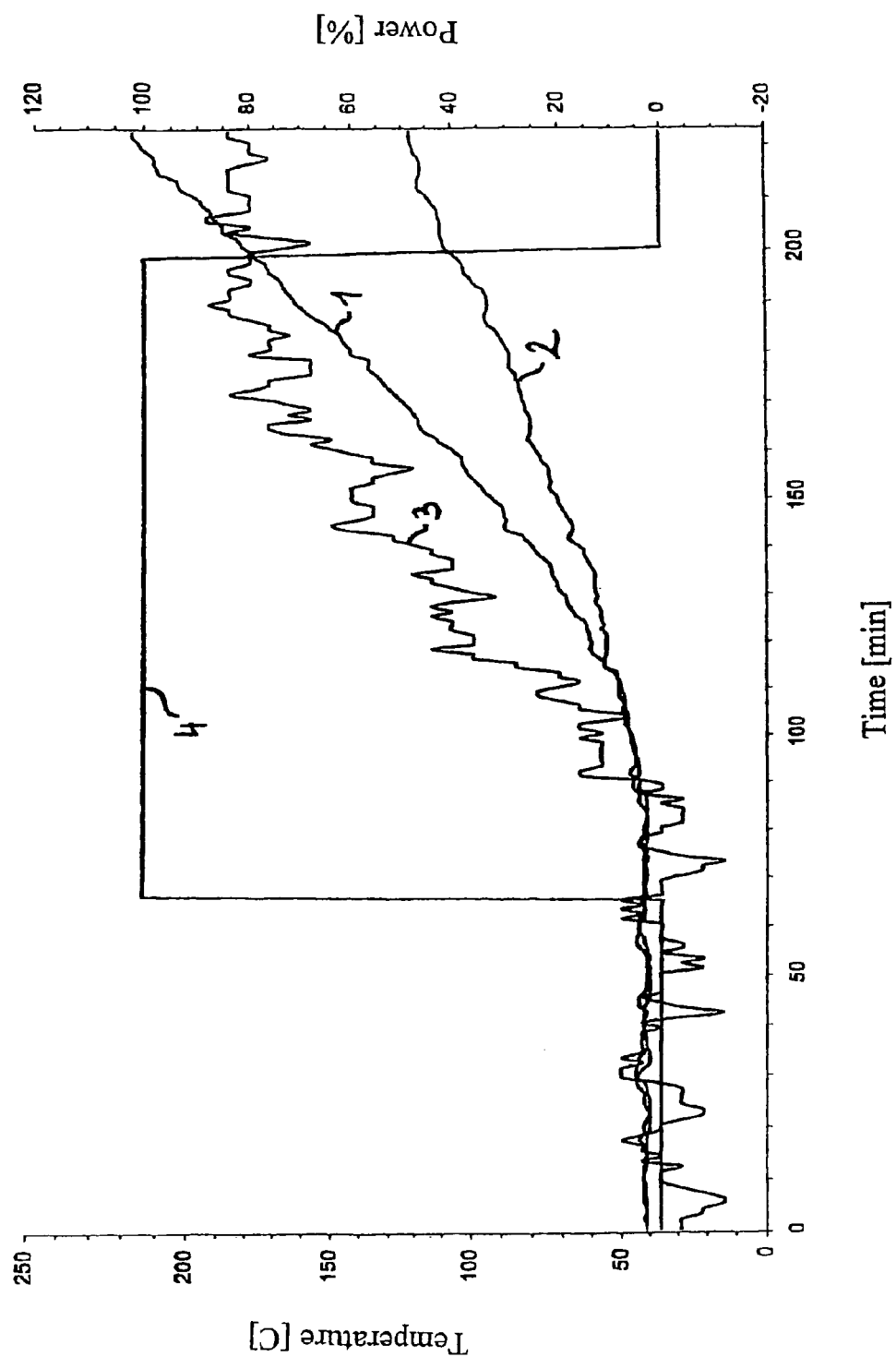
FIG. 2 is a diagram showing the temperature change plotted against time when the deep fryer apparatus is not filled with oil.

In FIG. 2 a diagram showing the temperature change plotted against time can be seen in the case when the deep fryer apparatus is not filled with oil. Here, temperature 1 at the bottom part changes at a much higher velocity than temperature 2 in the vicinity of the surface. Then one of the two aforementioned temperatures may be com-pared to a predetermined threshold value and in case it exceeds the predetermined value heating power 4 is cut off. It is to be noted that a derivative of the temperature rise in case of FIG. 1 or FIG. 2 can be easily obtained on the basis of processing the measured temperature values. These derivative values 3 are marked in FIGS. 1 and 2. It is distinctly visible that the derivative value rises to a greater extent than the temperature itself when there is no oil filled in the apparatus. Consequently, according to the invention instead of observing the temperature the derivative value 3 of the same is observed and when this derivative value 3 reaches a predetermined threshold value heating power 4 is cut off. According to the foregoing the aforementioned temperature may be either temperature 1 at the bottom part or temperature 2 in the vicinity of the surface.

Figure 3:
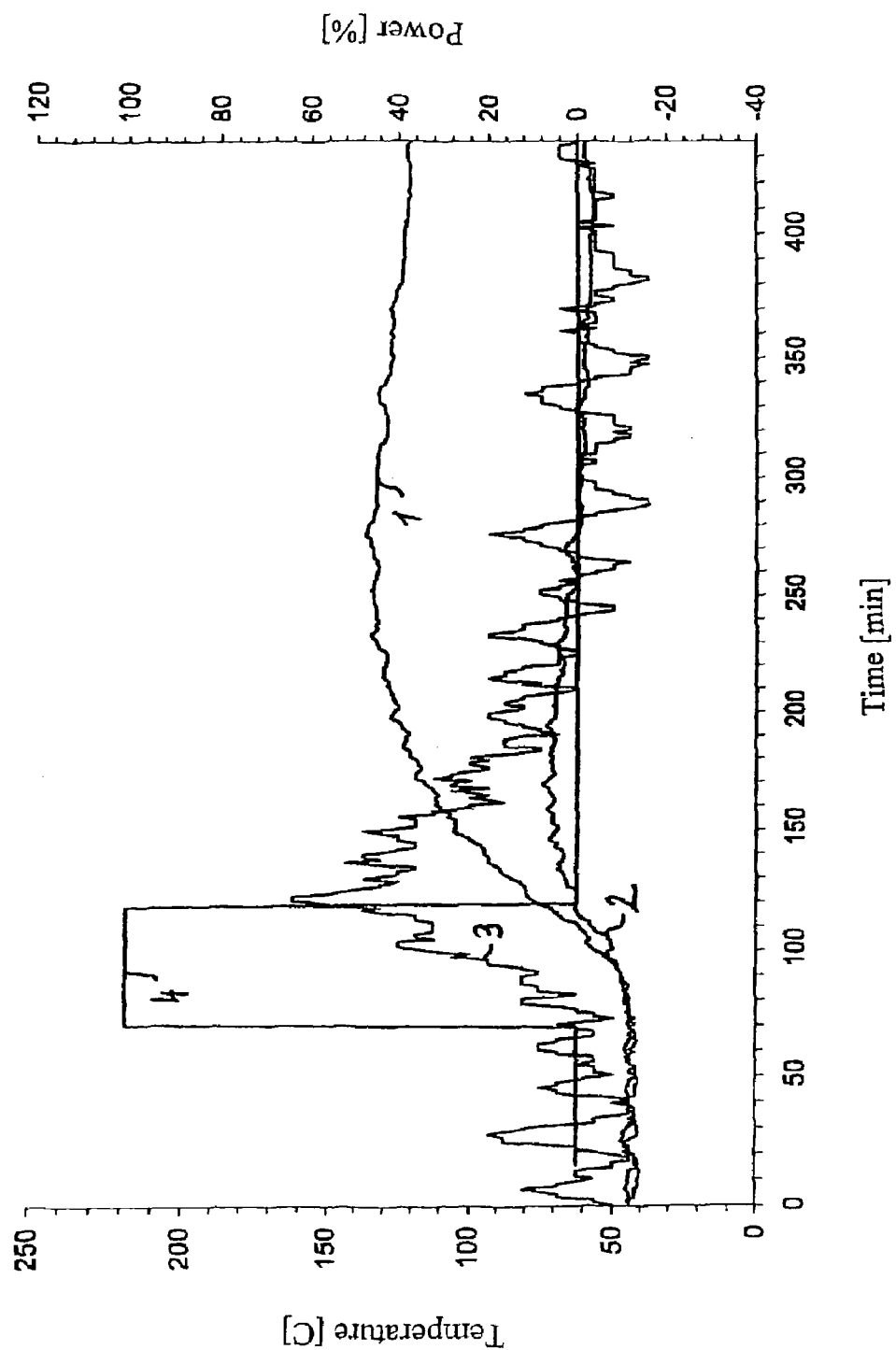
FIG. 3 is a diagram showing the temperature change plotted against time when the deep fryer apparatus is not filled with oil, and the heating power is cut off according to the method of the invention.

In FIG. 3 a diagram showing the temperature change plotted against time can be seen when the deep fryer apparatus is not filled with oil, and the heating power is cut off according to the method of the invention. It is perceptible that the value of the derivative 3 presented by an abrupt curve provides a more appropriate reference point for observing the threshold value and to cut off the heating power 4 than direct observation of the temperatures, irrespective of the positioning of the temperature sensors within the frying pan. In this way a much shorter reaction time can be achieved, consequently the fryer apparatus would be damaged to a lesser degree. It can be seen in the figure that local oscillations occur in the value of the derivative due to the nature of measuring and calculation, therefore it is practical to average the momentary value in a preceding time-interval window having a predetermined length, and the switched on state of the deep fryer apparatus is terminated automatically when the averaged value exceeds the threshold value. In an alternative embodiment a plurality of different threshold values may be determined in accordance with temperature sensors positioned at a plurality of determined points within the vessel of the deep fryer apparatus, and the switched on state of the apparatus may be terminated automatically when the value of the derivative of the temperature measured at any of the respective points exceeds the relevant threshold value.

The present invention can be suitably used with all kinds of frying apparatuses such as potato fryers in which the frying process takes place directly in the oil, and temperature sensors are used for control of the frying process in any case. The application of the method according to the invention is easy, since the control mechanism of the apparatus is adapted to compute the derivative (I.e. the differential quotient by the time) on the basis of the temperature values which are available anyway, so there is no need for modification of the control mechanism.

The advantage of the method according to the invention is that possible damage of the deep fryer apparatus and also burning out of the heating element can be prevented.

The invention claimed is:

1. A method for automatically switching off power to a heating element of a deep fryer when the deep fryer is accidentally switched on while not filled with oil, the deep fryer comprising a vessel having a closed bottom and sides wherein the heating element extends substantially horizontally within the vessel for direct contact with the oil, the method comprising:
   defining different relevant threshold values for respective ones of different locations within the vessel;
   measuring temperatures at said different locations within the vessel;
   determining respective derivatives of the temperatures measured; and
   automatically terminating power to the heating element when a value of one of the derivatives exceeds a respective one of said relevant threshold values.

2. A method according to claim 1, wherein the deep fryer is a potato fryer.

3. A method for automatically switching off power to a heating element of a deep fryer when the deep fryer is accidentally switched on while not filled with oil, the deep fryer comprising a vessel having a closed bottom and sides wherein the heating element extends substantially horizontally within the vessel for direct contact with the oil, the method comprising:
   defining different relevant threshold values for respective ones of different locations within the vessel;
   measuring temperatures at said different locations within the vessel;
   determining respective derivatives of the temperatures measured;
   averaging momentary values of at least one of the derivatives in a time interval window having a predetermined length to obtain an averaged value; and
   automatically terminating power to the heating element when said average value exceeds a respective one of said relevant threshold values.

4. A method according to claim 3, wherein the deep fryer is a potato fryer.

5. A control apparatus for automatically switching off power to a heating element of a deep fryer when the deep fryer is accidentally switched on while not filled with oil, the deep fryer comprising a vessel having a closed bottom and sides wherein the heating element extends substantially horizontally within the vessel for direct contact with the oil, the control comprising:
   sensors disposed at different locations within the vessel for measuring temperatures at each of the different locations, different relevant threshold values being assigned respectively to the different locations;
   a device for determining derivatives of the temperatures at the different locations; and
   a power termination device configured for automatically terminating power to the heating element when a value of one of the derivatives is determined to exceed a respective one of said relevant threshold values.

6. A control apparatus according to claim 5, wherein the deep fryer is a potato fryer.

* * * * *